(12) United States Patent
Schoenfeld et al.

(10) Patent No.: US 7,470,451 B2
(45) Date of Patent: Dec. 30, 2008

(54) BINDING AGENT COMPONENT FOR SURFACE COATING AGENTS WITH IMPROVED ADHESIVE PROPERTIES

(75) Inventors: Rainer Schoenfeld, New Berlin, WI (US); Gerald Schreiber, Duesseldorf (DE); Felix Rustemeyer, Duesseldorf (DE)

(73) Assignee: Henkel AG & Co. KGaA (DE)

( * ) Notice: Subject to any disclaimer, the term of this patent is extended or adjusted under 35 U.S.C. 154(b) by 607 days.

(21) Appl. No.: 10/485,759

(22) PCT Filed: Jul. 30, 2002

(86) PCT No.: PCT/EP02/08454

§ 371 (c)(1),
(2), (4) Date: Dec. 22, 2004

(87) PCT Pub. No.: WO03/014236

PCT Pub. Date: Feb. 20, 2003

(65) Prior Publication Data

US 2005/0129955 A1 Jun. 16, 2005

(30) Foreign Application Priority Data

Aug. 3, 2001 (DE) ................................. 101 38 127

(51) Int. Cl.
*B05D 7/16* (2006.01)
(52) U.S. Cl. ................. 427/386; 427/388.1; 427/388.2; 156/330
(58) Field of Classification Search ................. 427/386, 427/388.1, 388.2; 156/330
See application file for complete search history.

(56) References Cited

U.S. PATENT DOCUMENTS

| 4,058,497 A | 11/1977 | Ko et al. |
| 4,855,482 A | 8/1989 | Ueno et al. |
| 5,290,857 A | 3/1994 | Ashida et al. |
| 5,868,509 A | 2/1999 | Crutcher |

FOREIGN PATENT DOCUMENTS

| EP | 0 057 396 B1 | 1/1985 |
| EP | 0 275 115 B1 | 9/1992 |
| EP | 0 751 191 B1 | 7/2001 |
| JP | 63 010673 | 1/1988 |
| JP | 63 146846 | 6/1988 |
| JP | 08 066538 | 3/1996 |
| JP | 2000 143745 | 5/2000 |

OTHER PUBLICATIONS

Abstracts and translation of SU 1657518, Jun. 1991.*
Abstracts and translation of JP 2000—143745, May 2000.*
Abstracts and translation of JP 63—010673, Jan. 1988.*
Database WPI, Section Ch, Week 199519, Derwent Publications Ltd., London GB, Class A21, AN 1995-142956, XP002227675 of JP 0766538 (1995).
Patent Abstracts of Japan, vol. 2000, No. 08 of JP 2000 143745 (2000).
Database WPI, Section Ch, Week 198830, Derwent Publications Ltd., London GB, Class A28, An 1988-209581, XP002227676 of JP 63 146486 (1988).
Patent Abstracts of Japan, vol. 012, No. 209 of JP 63 010673 (1988).
US 5,714,527, 02/1998, Jilek et al. (withdrawn)

* cited by examiner

*Primary Examiner*—Erma Cameron
(74) *Attorney, Agent, or Firm*—Steven C. Bauman

(57) ABSTRACT

The invention relates to a binding agent composition, in particular an adhesive, containing at least one epoxy compound or at least one amino compound comprising at least two amino groups, or at least one hydroxy compound comprising at least two OH groups, or at least one mercapto compound comprising at least two mercapto groups, or at least one isocyanate comprising at least two NCO groups and a compound with chelating properties. The invention also relates to a method for producing binding agent compounds of this type and to the use of the same.

20 Claims, No Drawings

BINDING AGENT COMPONENT FOR SURFACE COATING AGENTS WITH IMPROVED ADHESIVE PROPERTIES

The present invention relates to a binder component, in particular an adhesive, comprising at least one epoxy compound or at least one amino compound having at least two amino groups or at least one hydroxy compound having at least two OH groups or at least one mercapto compound having at least two SH groups or at least one isocyanate having at least two NCO groups, to a process for preparing such binder components, and to their use.

The adhesion of a surface coating composition to a substrate surface is of great importance for the durable functioning of the surface coating composition. Exacting requirements in this respect are imposed in particular on adhesives intended for joining two substrates to one another with maximum durability. The bond strength of such an adhesive is on the one hand dependent on the compatibility between adhesive and the substrate to which the adhesive is to be applied, i.e., on the adhesion between adhesive and substrate. In addition, however, the bond strength also rests on the cohesion of the adhesive itself. Even small changes in the composition of the adhesive or in its molecular structure may give rise to a drastic reduction in bond strength and hence either may make the adhesive completely unusable or may weaken, or even totally destroy, a bond produced using such an adhesive.

It is therefore necessary right at the formulation stage of an adhesive to ensure that individual components supplied to such an adhesive do not adversely affect its bond strength. Furthermore, as a result of environmental influences and hence as a consequence of a change in the molecular structure of an adhesive, a bond produced using the adhesive may suffer detraction from its bond strength over a certain period of time to an extent such that it is no longer possible to ensure the firm bonding of two components.

The adhesion in particular of cured epoxy resins to metals, such as in the structural bonding of metals using epoxy resin adhesives, for example, falls considerably as a result of aging processes, particularly under the influence of moisture. In many cases this necessitates the use of costly and inconvenient pretreatment methods, priming being one example. Such pretreatment, however, is a disadvantage from the standpoint of cost. In many cases, moreover, such as with accident repairs in the bodywork area, these pretreatment methods can only be used to a limited extent. This is particularly true of the steel or aluminum components frequently employed in bodywork construction, since the adhesion of two-part epoxy resin adhesives to steel or aluminum, particularly when substrate pretreatment is inadequate, is frequently very poor.

As a consequence of these aging processes the adhesive may lose flexibility, cohesion or adhesion, or one or more other important properties. Especially when an adhesive is to be used outdoors it is necessary to ensure that such changes, brought about for example by moisture, which lead to a loss in bond strength do not occur at all, or occur only to an unavoidably small extent.

This need has led to a variety of possibilities being proposed to give adhesive bonds improved long-term stability even under the influence of environmental conditions such as moisture.

Thus, for example, the prior art discloses hot-curing epoxy resin adhesives whose adhesion to aluminum surfaces under normal conditions is adequate. A disadvantageous consequence affecting these adhesives, however, is that for certain applications, in extreme cases, the aging stability is not adequate.

It was therefore an object of the present invention to provide surface coating compositions which exhibit effective substrate adhesion even under extreme ambient conditions, particularly in cases of substantial moisture. The present invention was based in particular on an object of providing adhesives which exhibit excellent substrate adhesion and also excellent cohesion to a multiplicity of substrates, but particularly to metals, even under moist conditions.

It has now been found that surface coating compositions which comprise compounds with chelating ligands improve the adhesion of such surface coating compositions to metallic substrates in particular. The objects on which the invention is based are therefore achieved by binder components as described within the scope of the text below and as may be used as constituents of surface coating compositions, especially of adhesives.

The present invention accordingly provides a binder component comprising at least one epoxy compound or at least one amino compound having at least two amino groups or at least one hydroxy compound having at least two OH groups or a mercapto compound having at least two SH groups or at least one isocyanate having at least two NCO groups and at least one compound having chelating properties.

By a binder component in the context of the present invention is meant, therefore, a mixture comprising at least one epoxy compound or at least one amino compound having at least two amino groups or at least one hydroxy compound having at least two OH groups or at least one mercapto compound having at least SH groups or at least one isocyanate having at least two NCO groups and at least one compound having chelating properties. A binder component of the invention must therefore include at least one compound having chelating properties.

The term "include" here in the context of the present invention embraces not only those compounds having chelating properties that are present per se in the form employed in the binder component but also compounds having chelating properties that have been incorporated into the binder by a chemical reaction and are bonded covalently, for example, to said binder.

A binder composition for the purposes of the present invention means a composition which is suitable for the preparation of a binder. The term "binder composition" as used in the context of the present text relates pot only to binder compositions in the form of a one-component system but also to binder compositions which are present in two-component or multicomponent systems and which have to be mixed by the user in order to prepare the binder. In the context of the present invention, accordingly, the term "binder composition" is used for the physical entirety of the binder components needed for preparing a binder, irrespective of whether these components are already present in the mixed state or are still spatially separate. Decisive for the use of the term "binder composition" is the question of whether the individual binder components have been combined or blended in a form suitable for preparation of a binder.

A binder component of the invention may therefore be part of a one-component or multicomponent binder composition, the term "binder composition" referring to the entirety of all the constituents needed to form a binder. In the case of binders which form by chemical curing, such as are described in the context of the present invention, the individual constituents are often referred to as "resin" and "hardener", with resin and hardener reacting to form a binder under certain external conditions, including for example customary ambient conditions, to form covalent chemical bonds and to form polymers.

The term "binder component" as used in the context of the present text refers here both to the "resin" component and to the "hardener" component, unless expressly stated otherwise in each case.

For example, a binder composition of the invention may in accordance with the present invention include only one binder component of the invention and a further binder component which is not designed in accordance with the invention. Thus, for example, a binder composition of the invention may include as binder component a resin which comprises an aromatic amino compound having chelating properties. Such a resin constitutes a binder component of the invention. As hardener, however, the binder composition may include, for example, an amino compound which does not comprise an aromatic amino compound having chelating properties and which thus is not a binder component of the invention. On the basis of the binder component of the invention that is present in the binder composition, however, the overall binder composition does have the advantages of the invention. Conversely it is also possible for a binder composition of the invention to include, for example, a noninventive resin and an inventive hardener as binder components. The invention, however, also embraces those cases where a binder composition of the invention comprises two or more binder components of the invention.

The term "surface coating composition" as used in the context of the present text relates to a composition comprising at least one binder component of the invention. A surface coating composition in accordance with the present invention may contain exclusively one binder composition of the invention. It is, however, likewise possible, and contemplated, for a surface coating composition of the invention to include further additives as well as a binder composition in accordance with the present invention.

In one first embodiment of the present invention a binder component of the invention, as can be used, for example, as a resin, comprises at least one epoxy compound. Suitable epoxy compounds include in principle all types of compound which contain an oxirane ring.

Examples of suitable epoxy compounds are epoxidized soybean oil, epoxidized olive oil, epoxidized linseed oil, epoxidized castor oil, epoxidized groundnut oil, epoxidized corn oil, epoxidized cottonseed oil, and glycidyl compounds.

Glycidyl compounds contain a glycidyl group attached directly to a carbon, oxygen or nitrogen atom. Glycidyl or methylglycidyl esters are obtainable by reacting a compound having at least one NH, OH or carboxyl group in the molecule and epichlorohydrin and/or glycerol dichlorohydrin and/or methyl-epichlorohydrin. The reaction takes place advantageously in the presence of bases.

As compounds having at least one carboxyl group in the molecule it is possible, for example, to use aliphatic carboxylic acids. Examples of these carboxylic acids are glutaric acid, adipic acid, pimelic acid, suberic acid, azelaic acid, sebacic acid or dimerized or trimerized linoleic acid, acrylic acid, methacrylic acid, caproic acid, caprylic acid, lauric acid, myristic acid, palmitic acid, stearic acid or pelargonic acid, and the monocarboxylic or polycarboxylic acids mentioned in the further course of this text. Examples of suitable dicarboxylic acids are propanedicarboxylic acid, butanedicarboxylic acid (succinic acid), pentanedicarboxylic acid (glutaric acid), hexanedicarboxylic acid (adipic acid), heptanedicarboxylic acid, octanedicarboxylic acid, nonanedicarboxylic acid or decanedicarboxylic acid, dimmer fatty acid or trimer fatty acid, or a mixture of two or more thereof. Likewise suitable are the unsaturated dicarboxylic acids, maleic acid, fumaric acid, malic acid, pentenedicarboxylic acid, hexenedicarboxylic, heptenedicarboxylic acid or octenedicarboxylic acid.

Likewise suitable are cycloaliphatic carboxylic acids such as cyclohexanecarboxylic acid, tetrahydrophthalic acid, 4-methyltetrahydrophthalic acid, hexahydrophthalic acid, endomethylenetetrahydrophthalic acid or 4-methylhexahydrophthalic acid. Additionally suitable are aromatic monocarboxylic and polycarboxylic acids such as benzoic acid, phthalic acid, isophthalic acid, trimellitic acid or pyromellitic acid.

Glycidyl ethers or methylglycidyl ethers can also be obtained by reacting a compound having at least one free alcoholic OH group or a phenolic OH group and a suitably substituted epichlorohydrin under alkaline conditions or in the presence of an acidic catalyst with subsequent alkali treatment. Ethers of this type derive, for example, from acyclic alcohols such as ethylene glycol, diethylene glycol or higher poly(oxyethylene)glycols, propane-1,2-diol or poly(oxypropylene)glycols, butane-1,4-diol, poly(oxytetramethylene)glycols, pentane-1,5-diol, hexane-1,6-diol, hexane-2,4,6-triol, glycerol, 1,1,1-trimethylolpropane, bistrimethylolpropane, pentaerythritol, and sorbitol, and also from polyepichlorohydrins, butanol, amyl alcohol, and pentanol, and from monofunctional alcohols such as isooctanol, 2-ethylhexanol, isodecanol or technical-grade alcohol mixtures, examples being technical-grade fatty alcohol mixtures.

Further suitable ethers derive also from cycloaliphatic alcohols such as 1,3- or 1,4-dihydroxycyclohexane, 1,3- or 1,4-cyclohexanedimethanol, bis(4-hydroxycyclohexyl)-methane, 2,2-bis(4-hydroxycyclohexyl)propane or 1,1-bis (hydroxymethyl)cyclohex-3-ene or they possess aromatic nuclei such as N,N-bis(2-hydroxyethyl)aniline. Suitable epoxy compounds may also derive from mononuclear phenols, such as from phenol, resorcinol or hydroquinone, for example, or are based on polynuclear phenols such as bis(4-hydroxyphenyl)methane, 2,2-bis(4-hydroxyphenyl)propane (bisphenol A), 2,2-bis(3,5-dibromo-4-hydroxyphenyl)propane or 4,4'-dihydroxydiphenyl sulfones or on condensation products of phenol with formaldehyde that are obtained under acidic conditions, phenol-novolaks for example.

Examples of further epoxides suitable in the context of the present invention are glycidyl 1-naphthyl ether, glycidyl 2-phenylphenyl ether, biphenyl-2-yl glycidyl ether, N-(2,3-epoxypropyl)phthalimide or 2,3-epoxypropyl 4-methoxyphenyl ether.

Suitability in the context of the present invention is additionally possessed by cycloaliphatic epoxy resins such as 3',4'-epoxycyclohexylmethyl 3,4-epoxycyclohexylcarboxylate or bis((3,4-epoxycyclohexyl)methyl)adipate.

Likewise suitable are N-glycidyl compounds, such as are obtainable by dehydrochlorinating the reaction products of epichlorohydrin with amines which contain at least one amino hydrogen atom. Examples of such amines are aniline, N-methylaniline, toluidine, n-butylamine, bis(4-aminophenyl)methane, m-xylylenediamine or bis(4-methylaminophenyl)methane.

Epoxy compounds suitable in the context of the present invention contain at least one epoxy group, but preferably more than one epoxy group. Suitable, for example, are epoxy compounds containing at least about 1.1, 1.3 or 1.5 epoxy groups per molecule, but in particular two or more epoxy groups. If the number of epoxy groups in an epoxy compound which can be used in accordance with the invention does not give a whole number, then the compound is a mixture of epoxy compounds having a different number of epoxy groups. In this case the average value for all the compounds present which carry epoxy groups is stated as the number of epoxy groups per molecule.

In the epoxy compounds which can be used in the context of the present invention the epoxy group can be arranged either terminally or centrally within the molecule. If an epoxy compound which can be used in accordance with the invention carries more than one epoxy group, then these epoxy groups can be situated at any positions within the molecule. If, in the context of the present invention, for example, polymeric epoxides which carry more than, for example, two or three epoxy groups are used, then the epoxy groups may be arranged, for example, at the ends of the polymer backbone, within the polymer backbone or on side chains.

In one preferred embodiment epoxy compounds used include bisphenol A diglycidyl ethers, epoxidized diolefins such as 1,2,5,6-diepoxyhexane, 1,2,4,5-diepoxycyclohexane, dicyclopentadiene diepoxide, dipentene diepoxide, vinylcyclohexene diepoxide, epoxidized polyolefinically unsaturated carboxylic acids such as methyl 9,10,12,13-diepoxystearate or the dialkyl ester of 6,7,10,11-diepoxyhexadecane-1,16-dicarboxylic acid.

Likewise suitable are epoxidized mono-, di- or polyesters, epoxidized mono-, di- or polyurethanes, epoxidized mono-, di- or polycarbonates or epoxidized mono-, di- or polyacetals, especially those having at least one cycloaliphatic ring which carries at least two epoxy groups. Suitable polyesters, polyurethanes or polycarbonates are, for example, the polyesters, polyurethanes or polycarbonates stated within the text below, which may be provided in a manner known to the skilled worker with one or more epoxy groups. Another widespread class of polyepoxides are, for example, epoxy polyethers, such as are obtainable by reacting a halogenated epoxide, epichlorohydrin or epibromohydrin, 3-chloro-1,2-epoxyoctane and the like, for example, with a polyol.

Compounds additionally suitable as a constituent of a binder component of the invention are, for example, amino compounds having at least two amino groups.

Suitable nonaromatic amino compounds having at least two amino groups include in principle all diamines and polyamines.

Examples of suitable such compounds are ethylenediamine, propylenediamine, butylenediamine, hexamethylenediamine, 2,4,4-trimethylhexamethylene-diamine, diethylenetriamine, 1,12-diaminododecane, diamines derived from dimer fatty acids or triamines derived from trimer fatty acids, or a mixture of two or more of said compounds.

Examples of suitable cycloalkyl compounds which carry amino groups are cyclohexylenediamine, dicyclohexylenediamine, 4,4'-dicyclohexylmethanediamine, isophoronediamine, 1,3-bis(aminomethyl)cyclohexane, 1,4-bis(aminomethyl)cyclohexane, and hydrogenated toluenediamines such as 1-methyl-2,4-diaminocyclohexane, 1-methyl-2,6-diaminocyclohexane, and the like.

Likewise suitable as amino compounds are, for example, 1,4-diaminobenzene, diaminotoluene, m- or p-phenylenediamine, diaminobiphenyl, o-, m- or p-toluidine, 2,4-xylidine, 2,4- and 2,6-toluenediamine and corresponding mixtures, 4,4'-diphenylenediamine, naphthyldiamines, bis(4-aminophenyl)methane or mixtures of two or more of said compounds.

Likewise suitable as amino compounds are, for example, 1,3,5-trisaminoalkyl, cycloalkyl, and aryl isocyanurates. Examples that may be mentioned include the following: 1,3,5-tris(6-aminohexyl)isocyanurate, 1,3,5-tris(6-aminopropyl) isocyanurate, 1,3,5-tris(6-aminoethyl)isocyanurate, 1,3,5-tris(3-aminophenyl)isocyanurate, and 1,3,5-tris(4-methyl-3-aminophenyl)isocyanurate. It is likewise possible to employ mixtures of two or more of said compounds.

Likewise suitable as amino compounds for the purposes of the present invention are polyesters having an amino group as end groups or side groups or both. Polyesters of this kind can be obtained, for example, by polymer-analogous reaction of a carboxyl-carrying polyester with polyamines, the polyester containing either amino end groups or amino side groups or both.

Likewise suitable as amino compounds for the purposes of the present invention are polyetheramines. Polyetheramines are prepared, for example, by polymer-analogous reaction from polyetherpolyols. Suitable polyetherpolyols are obtained normally by reacting a starter compound containing at least two reactive hydrogen atoms with alkylene or arylene oxides, examples being ethylene oxide, propylene oxide, butylene oxide, styrene oxide, tetrahydrofuran and epichlorohydrin, or mixtures of two or more thereof.

Examples of suitable starter compounds include water, ethylene glycol, propylene 1,2- or 1,3-glycol, butylene 1,4- or 1,3-glycol, hexane-1,6-diol, octane-1,8-diol, neopentyl glycol, 1,4-hydroxymethylcyclohexane, 2-methyl-1,3-propanediol, glycerol, trimethylolpropane, hexane-1,2,6-triol, butane-1,2,4-triol, trimethylolethane, pentaerythritol, mannitol, sorbitol, methylglycosides, sugars, phenol, isononylphenol, resorcinol, hydroquinone, 1,2,2- or 1,1,2-tris(hydroxyphenyl)ethane, ammonia, methylamine, ethylenediamine, tetra- or hexamethyleneamine, triethanolamine, aniline, phenylenediamine, 2,4- and 2,6-diaminotoluene, and polyphenylpolymethylene-polyamines, as obtainable by aniline-formaldehyde condensation.

The functionalization of the polyetherpolyols with amino groups takes place in a manner known to the skilled worker. Thus, for example, conventional polyetherpolyols can be converted into the corresponding polyetheramines by reacting the terminal OH groups with ammonia or primary amines in accordance with methods known from the literature.

Such amino-functionalized polyetherpolyols are obtainable commercially, for example, under the trade name JEFFAMIN® in different compositions. Examples that may be mentioned are the Jeffamin grades D 230, D 400, and D 2000, based on difunctional polypropylene glycols, the grades T 403, T 3000, and T 5000, based on trifunctional polypropylene glycols, the grades ED 600, ED 900, ED 2001, and ED 6000, based on difunctional polyethylene glycols, and the grades M 300, M 600, M 1000, and M 2070, based on monofunctional polypropylene glycols.

Likewise suitable as amino compounds for the purposes of the present invention are amino-carrying polyacetals. Polyacetals are compounds such as are obtainable by reacting glycols, diethylene glycol or hexanediol for example, with formaldehyde. Polyacetals which carry n amino groups and can be used in the context of the invention can also be obtained by polymerizing cyclic acetals. The functionalization of such polyacetals with amino groups is subject to the same comments as already made in the context of the description of the polyesters.

Likewise suitable as amino compounds for the purposes of the present invention are amino-carrying polycarbonates. Polycarbonates can be obtained, for example, by reacting the abovementioned polyols, particularly diols such as propylene glycol, butane-1,4-diol or hexane-1,6-diol, diethylene glycol, triethylene glycol or tetraethylene glycol, or mixtures of two or more thereof, with diaryl carbonates, diphenyl carbonate for example, or phosgene. The functionalization of the polycarbonates with amino groups is subject to the same comments as already made in the context of the description of the polyesters.

Likewise suitable as amino compounds for the purposes of the present invention are amino-carrying polylactones. Suitable polylactones are preferably those deriving from compounds of the general formula HO—$(CH_2)_z$—COOH where z is a number from 1 to about 20. Examples are ε-caprolactone, β-propiolactone, γ-butyrolactone or methyl-ε-caprolactone, or mixtures of two or more thereof. The functionalization of the polylactones with amino groups is subject to the same comments as already made in the context of the description of the polyesters.

Likewise suitable as amino compounds for the purposes of the present invention are polyethylenimines. Suitable polyethylenimines may be obtained by polymerizing reaction of ethylenimine, and have a molecular weight of from about 300 to about 100 000.

Likewise suitable as amino compounds for the purposes of the present invention are amino-carrying polyamides. Suitable polyamides may be prepared, for example, by reacting the abovementioned dicarboxylic acids with corresponding diamines. Examples of suitable diamines are those which have a molecular weight of from about 32 to about 200 g/mol and contain at least two primary, two secondary or one primary and one secondary amino group(s). Examples thereof are diaminoethane, diaminopropanes, diaminobutanes, diaminohexanes, piperazine, 2,5-dimethylpiperazine, amino-3-aminomethyl-3,5,5-trimethylcyclohexane(isophorone-diamine, IPDA), 4,4'-diaminodicyclohexylmethane, 1,4-diaminocyclohexane, aminoethylethanolamine, hydrazine, hydrazine hydrate or, in small amounts if desired, diamines such as the diethylenetriamine or 1,8-diamino-4-aminomethyloctane. Another possibility is the synthesis from lactams such as ε-caprolactam or aminocarboxylic acids such as 11-aminoundecanoic acid. The functionalization of the polyamides with amino groups is subject to the same comments as already made in the context of the description of the polyesters.

Compounds additionally suitable as a constituent of a binder component of the invention are, for example, mercapto compounds or hydroxy compounds having at least two SH or OH groups. A description is given below of polyol compounds and their preparation, such as they may be used, for example, in the context of the present invention. In principle it is the case that for the purposes of the present invention it is also possible to employ the corresponding mercapto compounds such as are described by imaginary substitution of the OH groups in the polyols described below with SH groups.

Of such compounds, suitability is possessed, for example, by the low molecular mass polyhydroxy and polymercapto compounds, such as ethylene glycol, propylene 1,2- or 1,3-glycol, butylene 1,4- or 1,3-glycol, hexane-1,6-diol, octane-1,8-diol, neopentyl glycol, 1,4-hydroxymethylcyclohexane, 2-methyl-1,3-propanediol, glycerol, trimethylolpropane, hexane-1,2,6-triol, butane-1,2,4-triol, trimethylolethane, pentaerythritol, mannitol, sorbitol, methylglycosides, sugars, phenol, isononylphenol, resorcinol, hydroquinone, 1,2,2- or 1,1,2-tris(hydroxyphenyl)-ethane, ethylene dimercaptan, propylene-1,2-dithiol or -1,3-dithiol, butylene-1,4-dithiol or -1,3-dithiol, hexane-1,6-dithiol, octane-1,8-dithiol, neopentyldithiol, 1,4-mercaptomethylcyclohexane, 2-methyl-1,3-propanedithiol, thioglycerol, trimercaptopropane, hexane-1,2,6-trithiol, butane-1,2,4-trithiol, trimercaptoethane, thiopentaerythritol, mercaptomannitol, mercaptosorbitol, thio sugars, thiophenol, isononylthiophenol, thioresorcinol, thiohydroquinone, and 1,2,2- or 1,1,2-tris(thiophenyl)ethane.

Likewise suitable are polymeric mercapto and hydroxy compounds (polymer polymercaptans and polymer polyols) having a molecular weight of, for example, more than about 200 or more than about 500. These are, in particular, polyurethanepolymercaptans and polyurethanepolyols, polyesterpolymercaptans and polyesterpolyols, polyetherpolymercaptans and polyetherpolyols, and further polymercaptan and polyol compounds such as are described within the text below.

Suitable polyurethanepolymercaptans and polyurethanepolyols are preparable, for example, using the following building blocks:
  a) at least one polyisocyanate,
  b) at least one polymercaptan or polyol or a mixture of two or more thereof.

If desired it is possible in addition to use up to about 20% by weight of low molecular mass compounds (building block c) suitable for introducing SH or OH end groups, based on the polyurethane weight.

Suitable isocyanates (building block a) are any desired organic compounds containing on average more than one, in particular 2, isocyanate group(s).

It is preferred to use diisocyanates $Q(NCO)_2$ in which Q is an aliphatic, optionally substituted hydrocarbon radical having 4 to about 12 carbon atoms, an optionally substituted cycloaliphatic hydrocarbon radical having 6 to about 15 carbon atoms, an optionally substituted aromatic hydrocarbon radical having 6 to about 15 carbon atoms or an optionally substituted araliphatic hydrocarbon radical having 7 to about 15 carbon atoms. Examples of such diisocyanates are tetramethylene dilsocyanate, hexamethylenediisocyanate (HDI), dodecamethylene diisocyanate, dimer fatty acid diisocyanate, 1,4-diisocyanatocyclohexane, 1-isocyanato-3,3,5-trimethyl-5-isocyanatomethylcyclohexane(isophorone diisocyanate, IPDI), 4,4'-diisocyanatodicyclohexylmethyl, 2,2-bis (4-isocyanatocyclohexyl)propane, 1,3- and 1,4-diisocyanatobenzene, 2,4- or 2,6-diisocyanatotoluene (2,4- or 2,6-TDI) or a mixture thereof, 2,2'-, 2,4 or, 4,4'-diisocyanatodiphenylmethane (MDI), tetramethylxylylene diisocyanate (TMXDI), p-xylylene diisocyanate, and mixtures of these compounds.

Preference is given to aliphatic diisocyanates, particularly m- and p-tetramethylxylylene diisocyanate (TMXDI) and isophorone diisocyanate (IPDI).

It is of course also possible to use as well, proportionally, the higher polyfunctional polyisocyanates known per se in polyurethane chemistry or else modified polyisocyanates known per se, examples being polyisocyanates containing carbodiimide groups, allophanate groups, isocyanurate groups, urethane groups or biuret groups.

Suitable building blocks (b) are SH— or OH-terminated polymercaptans or polyols or those which carry pendant SH or OH groups (polymer mercaptans or polymer polyols) or polymercaptan mixtures or polyol mixtures, such as are known to the skilled worker for polyurethane preparation and can be used customarily in the preparation of polyurethanes. In the context of the present invention it is possible to use polymer mercaptans or polymer polyols from the group consisting of polyetherpolymercaptans and polyetherpolyols, polyesterpolymercaptans and polyesterpolyols, polyetheresterpolymercaptans and polyetheresterpolyols, polyalkylenedimercaptans or polyalkylenepolyols, polythiocarbonates and polythioacetals, or a mixture of two or more thereof, having in each case 2, 3, 4 or more SH or OH groups.

The polymer polymercaptans or polymer polyols described are suitable per se also as individual constituents of a binder component of the invention. The following description of the polymer polymercaptans or polymer polyols should therefore be understood such that the stated polymer polymercaptans or polymer polyols are also suitable as a constituent of a binder component in the sense of the invention.

The stated polymer polymercaptans or polymer polyols and their preparation are known from the state of the art or can be provided by the skilled worker with the aid of his or her general art knowledge. Thus, for example, polyesterpolymercaptans or polyesterpolyols can be prepared by reacting dicarboxylic acids with dithiols or diols or higher polythiols or polyols, or with a mixture of dithiols or diols and higher polythiols or polyols, or with an excess of dithiols or diols or higher polythiols or polyols, or mixtures thereof, and also by ring-opening epoxidized esters, such as epoxidized fatty acid esters, for example, with thiols or alcohols.

Suitable polyesterpolythiols or polyesterpolyols are obtainable, for example, by reacting dicarboxylic acids with dithiols or diols or higher polythiols or polyols, or with a mixture of dithiols or diols and higher polythiols or polyols, or with an excess of dithiols or diols or higher polythiols or polyols, or mixtures thereof, and also by ring-opening epoxidized esters, such as epoxidized fatty acid esters, for example, with thiols or alcohols. Polycaprolactonedithiols or polycaprolactonediols as well, preparable for example from ε-caprolactone and dithiols or diols or higher polythiols or polyols, are suitable as polyesterpolythiols or polyesterpolyols. In the context of the present invention it is possible to use, for example, polyesterpolythiols which are obtainable from low molecular mass dicarboxylic acids such as succinic acid, glutaric acid, adipic acid, isophthalic acid, terephthalic acid or phthalic acid, or from a mixture of two or more thereof, with an excess of linear or branched, saturated or unsaturated aliphatic dithiols having about 2 to about 12 carbon atoms. If desired, in the preparation of the polyesterpolythiols it is also possible for there to be a small fraction of thiols with a higher functionality, examples of which include thioglycerol, trimethylthiolpropane, triethylthiolpropane, thiopentaerythritol or thio sugars, such as thiosorbitol, thiomannitol or thioglucose.

Polyesterpolythiols or polyesterpolyols suitable in the context of the present invention for preparing polyurethanepolythiols or polyurethanepolyols are essentially linear and have, for example, a molecular weight of from about 1 000 to about 50 000 and also an SH or OH number of from about 10 to about 200, such as about 20 to 80, for example.

Polycaprolactonedithiols or polycaprolactonediols as well, preparable for example from ε-caprolactone and dithiols or diols or higher polythiols or polyols, are also suitable as polyesterpolythiols or polyesterpolyols. In the context of the present invention, for the preparation of the polyurethanepolythiols or polyurethanepolyols, it is possible to use, for example, polyesterpolythiols or polyesterpolyols which are obtainable from low molecular mass dicarboxylic acids such as succinic acid, glutaric acid, adipic acid, isophthalic acid, terephthalic acid or phthalic acid, or from a mixture of two or more thereof, with an excess of linear or branched, saturated or unsaturated aliphatic dithiols or diols having about 2 to about 12 carbon atoms. If desired, in the preparation of the polyesterpolythiols or polyesterpolyols, it is also possible for there to be a small fraction of higher-functionality mercaptans or alcohols, examples of which include glycerol, trimethylolpropane, triethylolpropane, pentaerythritol or sugar alcohols, such as sorbitol, mannitol or glucose, and also the corresponding thio analogs of said hydroxy compounds. The polyesterpolythiols or polyesterpolyols, however, are preferably essentially linear.

Polythioacetals or polyacetals that may be mentioned include for example the polycondensation products of formaldehyde and dithiols or diols or polythiols or polyols, or mixtures thereof, in the presence of acidic catalysts.

Polyetherpolyols or can be obtained, for example, by homopolymerization, copolymerization or block polymerization of alkylene oxides such as ethylene oxide, propylene oxide or butylene oxide, or mixtures of two or more thereof, or by reacting polyalkylene glycols with difunctional or trifunctional alcohols.

Likewise suitable are the polymerized ring-opening products of cyclic thioethers or ethers, tetrahydrofuran for example, with corresponding thiols or alcohols as starter molecules. If ester compounds are used as starter molecules, oligoesters or polyesters for example, then polyetheresters are obtained, containing both ether and ester groups. Said compounds can likewise be used as a polythiol component or polyol component in the preparation of polyurethanepolythiols or polyurethanepolyols.

In one preferred embodiment of the present invention the polyetherpolyols or compounds that are thio analogs thereof used in the preparation of polyurethanepolyols are the alkoxylation products, particularly the ethoxylation or propoxylation products, of difunctional or trifunctional thiols and/or alcohols. Difunctional or trifunctional alcohols used are in particular alcohols selected from the group consisting of ethylene glycol, diethylene glycol, triethylene glycol, 1,2-propanediol, dipropylene glycol, the isomeric butanediols, hexanediols, octanediols, technical-grade mixtures of hydroxy fatty alcohols having 14 to 22 carbon atoms, especially hydroxystearyl alcohol, trimethylolpropane or glycerol or mixtures of two or more of the stated alcohols and/or of the compounds that are thio analogs.

Besides the abovementioned polythiols or polyols it is possible as well to use, proportionally, as building block b) linear or branched, saturated or unsaturated aliphatic, monofunctional alcohols, especially methanol, ethanol, the isomers of propanol, of butanol or of hexanol, and fatty alcohols having about 8 to about 22 carbon atoms, examples being octanol, decanol, dodecanol, tetradecanol, hexadecanol or octadecanol, and the compounds that are thio analogs thereof. The stated fatty thiols or fatty alcohols are obtainable, for example, by reduction of natural fatty acids and can be used either as single substances or in the form of their technical-grade mixtures. Highly suitable, for example, are linear monothiols or monoalcohols, and particularly those having about 4 to about 18 carbon atoms. Instead of the linear or branched aliphatic thiols or alcohols or in a blend with them it is also possible to use monoalkyl polyether alcohols of varying molecular weight, preferably in the molecular weight ranges from about 1 000 to about 2 000, and/or the compounds that are thio analogs thereof thereof.

Likewise suitable for use as building block b) are polyfunctional, in particular difunctional, thiols or alcohols, such as are obtainable, for example, by hydrogenating dimeric or oligomeric fatty acids or their esters, castor oil, with $C_{1-4}$ alkyl alcohols, ring-opened, epoxidized fats or oils, $C_{12-18}$ fatty acid diethanolamides, monoglycerides of aliphatic $C_{8-22}$ fatty acids, polypropylene glycols or polysiloxanes containing terminal OH groups, or mixtures of two or more of said compounds can be employed.

In order to introduce SH or OH end groups such as may be employed in the context of the present invention for preparing the polyurethanepolythiols of polyurethanepolyols as building block c) suitable examples include polyvalent, in particular divalent, alcohols such as ethylene glycol, propylene glycol, propane-1,3-diol, butane-1,4-diol or hexane-1,6-diol, and/or the compounds that are thio analogs. Low molecular mass polyesterdithiols or polyesterdiols as well, such as succinic, glutaric or adipic bis(hydroxyethyl)esters or bis(mercaptoethyl)esters, or a mixture of two or more thereof, or low molecular mass dithiols or diols containing ether groups, such as diethylene glycol, triethylene glycol, tetraethylene glycol, dipropylene glycol, tripropylene glycol or tetrapropylene glycol, and the compounds that are thio analogs, can also be used as building block c).

Likewise suitable as polymer polyols or polymer polythiols are polyacrylates which carry SH or OH groups. These polyacrylates are obtainable, for example, by polymerizing ethylenically unsaturated monomers which carry an SH or OH group. Monomers of this kind are obtainable, for example, by esterifying ethylenically unsaturated carboxylic acids and difunctional thiols or alcohols, the thiol or alcohol generally being in a slight excess. Examples of ethylenically unsaturated carboxylic acids suitable for this purpose include acrylic acid, methacrylic acid, crotonic acid or maleic acid. Corresponding esters which carry SH groups are, for example, 2-mercaptoethyl acrylate, 2-mercaptoethyl methacrylate, 2-mercaptopropyl acrylate, 2-mercaptopropyl acrylate, 2-mercaptopropyl methacrylate, 3-mercaptopropyl acrylate or 3-mercaptopropyl methacrylate, or mixtures of two or more thereof; corresponding esters which carry OH groups are, for example, 2-hydroxyethyl acrylate, 2-hydroxyethyl methacrylate, 2-hydroxypropyl acrylate, 2-hydroxypropyl acrylate, 2-hydroxypropyl methacrylate, 3-hydroxypropyl acrylate or 3-hydroxypropyl methacrylate, or mixtures of two or more thereof.

As isocyanate which is present in the binder component of the invention and has at least two NCO groups suitability is possessed by, preferably, aromatic isocyanates, e.g., diphenylmethane diisocyanate, either in the form of the single isomers, as an isomer mixture of the 2,4'/4,4' isomers, or else carbodiimide-liquefied diphenylmethane diisocyanate (MDI), which is known, for example, under the trade name Isonate 143 L. It is additionally possible to use what is called "crude MDI", in other words the isomer/oligomer mixture of MDI, such as are obtainable, for example, under the trade name PAPI or Desmodur VK commercially. It is also possible to use what are called quasi-prepolymers, i.e., reaction products of MDI and/or of tolylene diisocyanate (TDI) with low molecular mass diols such as ethylene glycol, diethylene glycol, propylene glycol, dipropylene glycol or triethylene glycol, for example. Although the aforementioned isocyanates are the particularly preferred isocyanates it is also possible in special cases to use aliphatic and/or cycloaliphatic diisocyanates or polyisocyanates, such as hydrogenated MDI ($H_{12}$MDI), tetramethylxylylene diisocyanate (TMXDI), 1-isocyanatomethyl-3-isocyanato-1,5,5-trimethylcyclohexane (IPDI), hexane 1,6-diisocyanate (HDI), biuretization product of HDI, isocyanuratization product of HDI or dimer fatty acid diisocyanate. Suitable isocyanates having at least two NCO groups also include polyurethane prepolymers containing free isocyanate groups, which are adducts of an excess of polyfunctional isocyanates with polyfunctional alcohols: for instance, the reaction products of an aromatic or aliphatic diisocyanate with ethylene glycol, propylene glycol, glycerol, trimethylolpropane or pentaerythritol. Reaction products of diisocyanates with polyetherpolyols, e.g., polyetherpolyols based on polyethylene oxide or on polypropylene oxide, as well, can be used as prepolymers. A large number of such polyetherpolyols are known to the skilled worker.

Additionally of suitability as a constituent of the binder component of the invention are polycarboxylic acids and their anhydrides such as phthalic anhydride, tetrahydrophthalic anhydride, hexahydrophthalic anhydride, hexachloroendomethylenetetrahydrophthalic anhydride, pyromellitic anhydride, benzophenone-3,3',4,4'-tetracarboxylic dianhydride, the acids of the aforementioned anhydrides, and also isophthalic acid or terephthalic acid.

Likewise suitable as a constituent of the binder component of the invention are catalytic hardeners, examples being amidines such as dicyandiamide.

A binder component of the invention further comprises at least one compound having chelating properties.

By "chelating properties" are meant, in the context of the present text, the capacity of a compound to chelate one or more metal ions or metal atoms and so to be able to form chelates.

Compounds having chelating properties that are suitable in the context of the present invention are compounds in which metals, groups with single electron pairs or with electron vacancies and hydrogen are involved in forming a ring. They are compounds which occupy more than one coordination site on a metal atom, in other words are "polydentate" (the expression "multidentate" is also in use for "polydentate"). In this case, therefore, normally stretched compounds are formed into rings as a result of the formation of a complex by way of a metal atom or metal ion. The number of bound ligands depends on the coordination number of the central metal. A prerequisite for the formation of a chelate is that the compound that reacts with the metal contains two or more groups of atoms which act as electron donors.

A further possible kind of chelate formation is ring closure by way of hydrogen bonds. This case is present, for example, in $\alpha$- and $\beta$-hydroxycarbonyl compounds, i.e., hydroxycarboxylic acids, hydroxyketones, and hydroxyaldehydes, and their analogs. They also include enolizable 1,3-diketones such as acetylacetone and homologs thereof. Chelate compounds are especially stable when five- or six-membered rings are formed.

The compounds having chelating properties that can be used in the context of the present invention contain in the context of the present invention preferably at least one functional group which allows the compound to be incorporated into a binder. With particular preference, in the context of the present invention, a functional group of this kind is an amino group or a mercapto group. The functional group may be involved in the chelating properties of the compound. In the context of the present invention, however, it is preferred to use those compounds having chelating properties wherein the functional group required for incorporating the compound into the binder makes no contribution, or at least no substantial contribution, to the chelating properties of the compound.

A compound having chelating properties such as it may be employed in accordance with the present invention as a constituent of the binder components or binder compositions of the invention has at least two functional groups which make the compound capable of forming chelate complexes. A compound which can be used in the context of the present invention preferably has, for example, at least one functional group, preferably at least two functional groups, selected from the group consisting of $SO_3H$, $OSO_3H$, $OP(O)(OH)_2$, $P(O)(OH)_2$, $P(O)HOH$, COOH, OH, $NH_2$, $NHR^8$, $C(O)R^8$, CN and $NO_2$, $R^8$ being hydrogen or a linear or branched, saturated or unsaturated aliphatic hydrocarbon radical having 1 to 10 carbon atoms.

Preferred chelating compounds have the general formula X-Z-Y, in which X and Y each independently of one another are one of the abovementioned functional groups and Z is any desired aromatic or aliphatic parent structure, Z having at least one functional group suitable for incorporating the chelating compound into a binder, and the functional groups X and Y being arranged on Z in such a way that they have chelating properties.

Compounds suitable in the context of the present invention as a constituent of the binder components and binder compositions of the invention include, for example, aliphatic compounds which not only have chelating properties but are also suitable for reaction with an epoxy compound.

Aliphatic compounds suitable for this purpose are, for example, 2-amino-2-methyl-1,3-propanetriol, 3-aminomethyl-1,2-propanetriol, 3-amino-1,2-propanetriol, 2-aminoalkyl-malonic acid such as 2-aminomethyl-malonic acid, glutamic acid or aspartic acid.

In the context of the present invention the binder components and binder compositions of the invention preferably include at least one aromatic amine of the general formula I, II or III, or a mixture of two or more thereof,

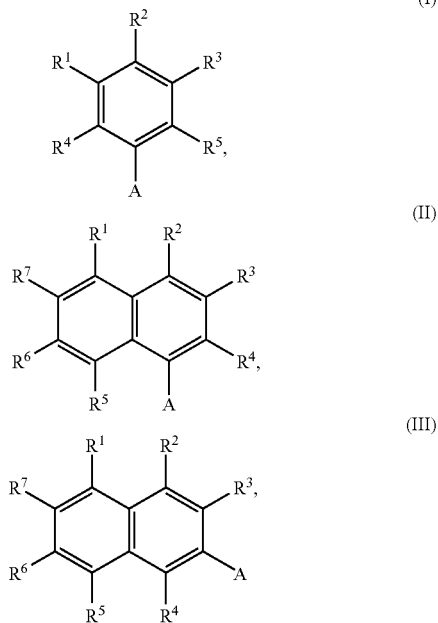

in which A is Y or X—Y, and Y is $NH_2$, $NHR^8$ or SH, and X is a linear or branched alkyl radical having 1 to 22 carbon atoms, and $R^1$, $R^2$, $R^3$, $R^4$, $R^5$, and in formulae II and III, $R^6$ and $R^7$, independently of one another, are H, $SO_3H$, $OSO_3H$, $OP(O)(OH)_2$, $P(O)(OH)_2$, $P(O)HOH$, COOH, OH, $NH_2$, $NHR^8$, $C(O)R^8$, CN or $NO_2$, in which $R^8$ is hydrogen or a linear or branched, saturated or unsaturated aliphatic hydrocarbon radical having 1 to 10 carbon atoms, or two adjacent radicals from $R^1$ to $R^7$ together form an aromatic or heteroaromatic ring, at least two of the radicals $R^1$ to $R^7$ not being H or part of an aromatic or heteroaromatic ring system, and the remaining radicals being arranged such that the compound of the general formula I, II or III is able to bind a divalent or polyvalent metal ligand in chelate form.

In the binder components of the invention it is preferred to use those compounds in which $R^4$ and $R^5$ are H. It is particularly preferred if at least one of the radicals $R^1$ to $R^3$ is COOH.

Compounds suitable as chelating compounds in the context of the present invention contain as chelating groups preferably a combination of COOH and CHO, COOH and OH, COOH and $SO_3H$, COOH and COOH, $SO_3H$ and OH, $SO_3H$ and CHO, $OP(O)(OH)_2$ and COOH, $OP(O)(OH)_2$ and OH, $OP(O)(OH)_2$ and $OP(O)(OH)_2$, $OP(O)(OH)_2$ and CHO, $P(O)(OH)_2$ and $P(O)(OH)_2$, $P(O)(OH)_2$ and COOH, $P(O)(OH)_2$ and $SO_3H$, $P(O)HOH$ and COOH, $P(O)HOH$ and $P(O)HOH$, $P(O)HOH$ and OH, CHO, $P(O)HOH$, and $SO_3H$.

In the context of the present invention it is possible for a binder component of the invention or binder composition of the invention to comprise, for example, in each case only one of the stated compounds having chelating properties. Likewise contemplated within the context of the present invention, however, is for a binder component of the invention or binder composition of the invention to comprise a mixture of two or more of the abovementioned chelating compounds. Thus, for example, a binder composition of the invention which includes two binder components may comprise two chelating compounds, with in each case one of the binder components involved in the binder composition of the invention comprising a chelating compound which is different with regard to the second binder component. It is also possible, however, in accordance with the invention for one binder component to comprise two or more different chelating compounds.

In one particularly preferred embodiment of the present invention a binder combination of the invention or binder of the invention comprises aminosalicyclic acid, especially 4-amino-2-hydroxybenzoic acid or 5-amino-2-hydroxybenzoic acid or a derivative thereof, or 5-aminoisophthalic acid or derivative thereof, -or 1-amino-2-hydroxynaphthalene-4-sulfonic acid or aminosalicylaldehyde, 4-aminophthalic acid, 4-aminophthalonitrile, mercaptosalicylic acid or mercaptoisophthalic acid, or a mixture of two or more of said compounds.

A binder component of the invention may include one chelating compound, as described above, or a mixture of two or more such chelating compounds in an amount of more than about 0.05 to about 50% by weight. The fraction of a chelating compound or of a mixture of two or more chelating compounds in a binder component of the invention is preferably from about 0.1 to about 30% by weight, in particular from about 1 to about 25% by weight, for example, from about 2 to about 20% by weight.

Within the context of the present invention it is possible, and also contemplated, for a binder component of the invention to comprise the chelating compound not, or not exclusively, in free form but instead already wholly or partly in conjunction with a compound that is present in the binder component. This will frequently be the case when, for example, the chelating compound is added to a binder component which functions as a resin within a binder composition. If, for example, a chelating compound is added to an epoxy compound used as resin in the context of the present invention, then there may be reaction of the amino group or of the mercapto group of the chelating compound with the epoxy compound. If, therefore, in the context of the present text, the amount of chelating compounds in a binder component is specified, this will be a reference not only to the amount of free chelating compounds in the binder component but also to the amount of bound chelating compounds.

The binder components of the invention are suitable for preparing binder compositions having improved adhesion properties on a very wide variety of substrates.

The present invention accordingly also provides a binder composition comprising at least one epoxy compound and at least one amino compound having at least two amino groups or at least one epoxy compound and at least one mercapto compound having at least two SH groups or at least one epoxy compound and at least one hydroxy compound having at least two OH groups or at least epoxy compound and at least one amino compound having at least two amino groups and at least one mercapto compound having at least two SH groups and at least one compound having chelating properties.

Likewise provided by the invention is a one-component or multicomponent binder composition comprising at least one isocyanate having at least two NCO groups and at least one compound having chelating properties.

The binder components of the invention can be prepared simply by mixing the compounds involved in the respective binder components.

The present invention hence also provides a process for preparing a binder component of the invention, wherein at least one epoxy compound or at least one amino compound having at least two amino groups or at least one hydroxy compound having at least two OH groups or at least one mercapto compound having at least two SH groups or at least one isocyanate having at least two NCO groups or a mixture of two or more of said compounds is mixed with at least one compound having chelating properties.

The mixing in the context of the present invention can essentially take place at any desired temperatures at which the individual components are miscible. Suitable temperatures are from about 10 to about 50° C., for example. Within the context of the process of the invention, however, it is also possible and contemplated for the preparation of a binder component of the invention to be conducted at an elevated temperature. This is especially advantageous in those cases where the compound having chelating properties and the other compounds present in the binder component are immiscible or only poorly miscible. In such cases, mixing at elevated temperature, for example, may bring about a chemical reaction between the compound having chelating properties and the resin component, so that the compound having chelating properties or a mixture of two or more such compounds is attached covalently to the resin to give a homogeneous mixture.

In a further preferred embodiment a binder composition of the invention comprises, for example, the following components:

| | |
|---|---|
| 20-90% | by weight of an epoxy compound |
| 3-79.9% | by weight of a polymercaptan or polyamine hardener |
| 0-50% | by weight of fillers |
| 0-35% | by weight of impact modifiers |
| 0-15% | by weight of auxiliaries |
| 0.5-50% | by weight of a chelating compound | or

| | |
|---|---|
| 35-90% | by weight of an epoxy compound |
| 2-10% | by weight of a catalytic hardener such as dicyandiamide |
| 3-40% | by weight of fillers |
| 0-35% | by weight of impact modifiers |
| 0-15% | by weight of auxiliaries |
| 1-12% | by weight of a chelating compound | or

| | |
|---|---|
| 40-80% | by weight of an epoxy compound |
| 10-60% | by weight of a polymercaptan or polyamine hardener |
| 0-5% | by weight of auxiliaries |
| 2-15% | by weight of a chelating compound |
| 50-80% | by weight of a diglycidyl ether |
| 10-49% | by weight of a polyetheramine which carries at least two amino groups, in particular a Jeffamin, or of a polyaminoamide hardener, and |
| 2-12% | by weight of a chelating compound | or

| | |
|---|---|
| 25-60% | by weight of an epoxy compound |
| 15-40% | by weight of a polyamine or polymercaptan |
| 10-40% | by weight of fillers |
| 0-20% | by weight of impact modifiers |
| 0-15% | by weight of auxiliaries |
| 1-12% | by weight of a chelating compound |

The binder components and binder compositions of the invention are suitable for preparing surface coating compositions, particularly for preparing adhesives.

The present invention accordingly also provides a surface coating composition at least comprising a binder component of the invention, a binder component prepared in accordance with the invention or a binder composition of the invention.

A corresponding surface coating composition of the invention may be composed exclusively, for example, of a binder composition of the invention. It is, however, also contemplated in accordance with the invention for a surface coating composition to comprise one or more further auxiliaries and additives as well as a binder composition of the invention.

Examples of suitable auxiliaries and additives include stabilizers, defoamers, antioxidants, photostabilizers, pigment dispersants, fillers, plasticizers, tackifiers, dyes, including indicator dyes, microbicides, impact modifiers, and the like.

Examples of suitable plasticizers include esters such as abietic esters, adipic esters, azelaic esters, benzoic esters, butyric esters, acetic esters, esters of higher fatty acids having about 8 to about 44 carbon atoms, esters of OH-carrying or epoxidized fatty acids, fatty acid esters and fats, glycolic esters, phosphoric esters, phthalic esters, linear or branched alcohols containing 1 to 12 carbon atoms, propionic esters, sebacic esters, sulfonic esters, thiobutyric esters, trimellitic esters, citric esters, and nitrocellulose-based and polyvinyl acetate-based esters, and also mixtures of two or more thereof. Particularly suitable esters are the asymmetric esters or difunctional aliphatic dicarboxylic acids, an example being the esterification product of monooctyl adipate with 2-ethylhexanol (Edenol DOA, Henkel, Dusseldorf, Germany).

Likewise suitable as plasticizers are the single or mixed ethers of monofunctional, linear or branched $C_{4-16}$ alcohols or mixtures of two or more different ethers of such alcohols, examples being dioctyl ethers (available as Cetiol OE, Henkel, Dusseldorf).

In another embodiment endgroup-capped polyethylene glycols can be used as plasticizers. For example, polyethylene or polypropylene glycol di-$C_{1-4}$ alkyl ethers, especially the dimethyl or diethyl ethers of diethylene glycol or dipropylene glycol, and also mixtures of two or more thereof.

Likewise suitable as plasticizers in the context of the present invention are diurethanes. Diurethanes can be prepared, for example, by reacting diols having OH end groups with monofunctional isocyanates, by selecting the stoichiometry such that essentially all of the free OH groups are consumed by reaction. Any excess isocyanate can be removed subsequently by means, for example, of distillation from the reaction mixture. Another method of preparing diurethanes consists in the reaction of monofunctional alcohols with diisocyanates, with all of the NCO groups, as far as possible, being consumed by reaction.

For the preparation of diurethanes based on diols it is possible to use diols having 2 to about 22 carbon atoms, examples being ethylene glycol, propylene glycol, 1,2-propanediol, dibutanediol, hexanediol, octanediol or technical-grade mixtures of hydroxy fatty alcohols with about 14 carbon atoms, especially hydroxystearyl alcohol. Preference is given to linear diol mixtures, particularly those containing polypropylene glycol having an average molecular weight ($M_n$) of from about 1 000 to about 6 000 in amounts of more than about 50% by weight, in particular more than about 70% by weight. Very particular preference is given to diurethanes based exclusively on propylene glycol, having identical or different average molecular weights of from about 1 000 to about 4 000. The free OH groups of the diol mixtures are essentially all consumed by reaction with aromatic or aliphatic monoisocyanates or mixtures thereof. Preferred monoisocyanates are phenol isocyanate or tolylene isocyanate or mixtures thereof.

For preparing diurethanes based on diisocyanates, aromatic or aliphatic diisocyanates or mixtures thereof are used. Suitable aromatic or aliphatic diisocyanates are, for example, the isocyanates as indicated above as being suitable for preparing the polyurethane of the invention, preferably tolylene diisocyanate (TDI). The free NCO groups of the diisocyanates are essentially completely reacted with monofunctional alcohols, preferably linear monofunctional alcohols or mixtures of two or more different monofunctional alcohols. Mixtures of linear monofunctional alcohols are particularly suitable. Suitable monoalcohols are, for example, monoalcohols having 1 to about 24 carbon atoms, examples being methanol, ethanol, the positional isomers of propanol, butanol, pentanol, hexanol, heptanol, octanol, decanol or dodecanol, especially the respective 1-hydroxy compounds, and also mixtures of two or more thereof. Likewise suitable are what are called "technical-grade mixtures" of alcohols and endgroup-capped polyalkylene glycol ethers. Particularly suitable are alcohol mixtures containing polypropylene glycol monoalkyl ethers having an average molecular weight ($M_n$) of from about 200 to about 2 000 in an amount of more than about 50% by weight, preferably more than about 70% by weight, based on the alcohol mixture. Particular preference is given to diurethanes based on diisocyanates whose free NCO groups have been fully reacted by means of polypropylene glycol monoalkyl ether having an average molecular weight of from about 500 to about 2 000.

A surface coating composition of the invention may further contain up to about 7% by weight, in particular up to about 5% by weight, of antioxidants.

A surface coating composition of the invention may further contain up to about 5% by weight of catalysts for controlling the cure rate. This is especially advantageous when the surface coating compositions are intended to cure at low temperatures, at from about 10 to about 30° C. for example, and comprise as binder a compound having relatively unreactive functional groups, OH groups for example.

Suitable catalysts are, for example, organometallic compounds such as iron compounds or tin compounds, especially the 1,3-dicarbonyl compounds of iron or of divalent or tetravalent tin, particularly the Sn(II)carboxylates or the dialkyl-Sn(IV)dicarboxylates or the corresponding dialkoxylates, examples being dibutyltin dilaurate, dibutyltin diacetate, dioctyltin diacetate, dibutyltin maleate, tin(II)octoate, tin(II) phenolate or the acetylacetonates of divalent or tetravalent tin. Likewise suitable are tertiary amines such as 2,4,6-tris (dimethylaminoethyl)phenol, imidazoles such as 1-methylimidazole, 2-ethyl-4-methylimidazole, or Mannich bases and also salts thereof or quaternary ammonium compounds such as benzyldimethylamine, 2,4,6-tris(dimethylaminoethyl)-phenol, 4-aminopyridine, tripentylammonium phenolate or tetramethylammonium chloride, or substituted ureas such as N-phenyl-N',N'-dimethylurea(fenuron), N-(4-chlorophenyl)-N',N'-dimethylurea or N-(3-chloro-4-methylphenyl)-N',N'-dimethylurea(chlortoluron). The selection of further suitable catalysts, which is otherwise guided in particular by the type of binder composition—for example, whether that composition is a polyester composition or a polyurethane composition—is readily possible for the skilled worker on the basis of the present invention.

A surface coating composition of the invention may contain up to about 20% by weight of customary tackifiers. Examples of suitable tackifiers include resins, terpene oligomers, coumarone/indene resins, aliphatic, petrochemical resins, and modified phenolic resins.

A surface coating composition of the invention may contain up to about 40% by weight, for example, up to about 20% by weight, of fillers. Examples of suitable fillers include inorganic compounds such as barium sulfate, chalk, lime flour, precipitated silica, pyrogenic silica, zeolites, bentonites, ground minerals, glass beads, glass flour, glass fibers, including short-cut glass fibers, and other inorganic fillers known to the skilled worker, and also organic fillers, especially short-cut fibers or hollow plastic beads.

A surface coating composition of the invention may contain up to about 2% by weight, preferably about 1% by weight, of UV stabilizers. Particularly suitable UV stabilizers are those which are called hindered amine light stabilizers (HALS).

Particularly suitable in this respect are the products Lowilite 75 and Lowilite 77 (Great Lakes, USA).

A surface coating composition of the invention may contain up to about 30% by weight, for example, up to about 20% by weight, of impact modifiers. Examples of suitable impact modifiers include 1,3-diene polymers containing carboxyl groups, and further polar, ethylenically unsaturated comonomers. Examples of suitable dienes include butadiene, isoprene or chlorobutadiene, preferably butadiene. Examples of polar, ethylenically unsaturated comonomers are acrylic acid, methacrylic acid, lower alkyl esters of acrylic or methacrylic acid, their methyl or ethyl esters, for example, amides of acrylic or methacrylic acid, fumaric acid, itaconic acid, maleic acid or the lower alkyl esters or monoesters thereof, or maleic or itaconic anhydride, vinyl esters such as vinyl acetate, or in particular, acrylonitrile or methacrylonitrile. Particularly preferred impact modifiers are, for example, carboxyl-terminated butadiene acrylonitrile copolymers (CTBN), which are sold in liquid form under the name Hycar by the company B.F. Goodrich. These products have molecular weights of between about 2 000 and about 5 000 and acrylonitrile contents of between about 10% by weight and about 30% by weight. Specific examples are Hycar CBTN 1300 X8, 1300 X13 or 1300 X15.

As impact modifiers it is additionally possible as well to use the core/shell polymers known from U.S. Pat. No. 5,290, 857 or from U.S. Pat. No. 5,686,509. In this case the core monomers ought to have a glass transition temperature of −30° C. or less. These monomers may be selected, for example, from the group of the abovementioned diene monomers or from suitable acrylate or methacrylate monomers. The core polymer may if desired include crosslinking comonomer units in minor amount. The shell is constructed, for example, from copolymers having a glass transition temperature of at least about 60° C. The shell is preferably constructed from lower alkyl acrylate or methacrylate monomer units (methyl or ethyl esters, for example) and also from polar monomers such as acrylonitrile, methacrylonitrile, acrylamide, methacrylamide, styrene or free-radically polymerizable, unsaturated carboxylic acids or carboxylic anhydrides.

In one preferred embodiment the above liquid CTBN rubbers are used as impact modifiers.

The surface coating compositions of the invention are suitable for a broad field of applications in the area of surface coatings, adhesives, and sealants. The formulations of the invention are especially suitable, for example, as a contact adhesive, one-part adhesive, two-part adhesive, assembly adhesive, sealant, especially joint sealant, and also for surface sealing.

They exhibit improved adhesion to substrates, particularly to metal surfaces. Moreover, the aging stability of the substrate/polymer assembly is significantly improved, especially under moist conditions.

The invention accordingly further provides for the use of a binder component of the invention or of a binder component prepared in accordance with the invention, or of a binder composition of the invention, in surface coating compositions.

The surface coating compositions of the invention can be in the form either of one-part systems or of two-part systems.

The surface coating compositions of the invention are suitable, for example, as an adhesive for plastics, metals, mirrors, glass, ceramic, mineral substrates, wood, leather, textiles, paper, paperboard, and rubber, particularly for the adhesive bonding of metals, it being possible for the materials in each case to be bonded to themselves or arbitrarily to one another.

The surface coating compositions of the invention are additionally suitable, for example, as a sealant for plastics, metals, mirrors, glass, ceramic, mineral substrates, wood, leather, textiles, paper, paperboard, and rubber, it being possible for the materials in each case to be sealed with themselves or arbitrarily from one another.

The surface coating compositions of the invention are suitable, moreover, for example, as surface coating compositions for surfaces of plastic, metal, glass, ceramic, mineral materials, wood, leather, textiles, paper, paperboard, and rubber.

The present invention likewise provides for the use of an amino compound having chelating properties as an adhesion promoter in surface coating compositions.

The invention is illustrated below by means of examples.

EXAMPLES

Example 1

The adhesives were prepared by stirring hardener and chelating compound at about 100° C. for about 10 minutes. After the mixture had been cooled to room temperature (RT, 20° C.) the resin was stirred in. An adhesive thus prepared was used to bond clean and degreased steel panels 25 mm in width with a 10 mm overlap, and the systems were cured at 120° C. for 60 minutes. The bonded panels were subsequently stored for a week. Thereafter the tensile shear strength of the bond was determined. Further test specimens prepared identically were subjected to a test under humid conditions at 70° C. and immediately following their removal were investigated in the moist state for their tensile shear strength.

To allow the hot humid test to be carried out, the test specimens were wrapped up in a paper cloth soaked with distilled water. This arrangement was subsequently enclosed in aluminum foils and stored in a plastic vessel with an air-tight seal at 70° C. for one week or for two weeks. After the corresponding storage time the samples were removed, frozen at −20° C., thawed, and then immediately, at room temperature, investigated for their tensile shear strength.

In order to examine the effectiveness of the binder components of the invention the adhesives indicated in the table below were prepared.

TABLE 1

| | Adhesive formulations (all amounts in % by weight) | | |
|---|---|---|---|
| Example | Resin | Hardener | Chelating compound |
| 1 | DGEBA 62.2% | J D-400 37.8% | — |
| 2 | DGEBA 60.2% | J D-400 34.7% | 4-amino-2-hydroxy-benzoic acid 5.1% |
| 3 | DGEBA 60.2% | J D-400 34.7% | 5-amino-2-hydroxy-benzoic acid 5.1% |
| 4 | DGEBA 62.5% | J D-400 33.3% | 5-aminoisophthalic acid 5.0% |
| 5 | DGEBA 61.7% | J D-400 33.3% | 1-amino-2-hydroxy-naphthalene-4-sulfonic acid 5.0% |
| 6 | DGEBA 60.2% | J D-400 34.7% | 4-aminobenzoic acid 5.1% |
| 7 | DGEBA 60.7% | J D-400 34.3% | aminophenol 5.0% |

DGEBA = bisphenol A diglycidyl ether
J D-400 = Jeffamin D-400 (manufacturer: Huntsman Chemical Company)

Examples 1, 6, and 7 are Comparative Examples.

The tensile shear strengths found after 1 week of storage and after 1 or 2 weeks in the hot humid test are reproduced in Table 2 below.

TABLE 2

| | Tensile shear strengths of the test specimens (all in MPa) | | |
|---|---|---|---|
| Example | TSS 1 | TSS 2 | TSS 3 |
| 1 | 23.5 | 9.0 | 9.2 |
| 2 | 29.3 | 14.1 | 17.3 |
| 3 | 32.3 | 20 | 24.1 |
| 4 | 30.8 | 14.2 | 16.9 |
| 5 | 28.2 | 14.2 | 15.4 |
| 6 | 23.4 | 9.4 | 4.4 |
| 7 | 23.1 | 12.1 | 12.3 |

TSS 1 = tensile shear strength after 1 week of storage at RT
TSS 2 = tensile shear strength after 1 week of hot humid test
TSS 3 = tensile shear strength after 2 weeks of hot humid test Example 2

Reference adhesive (not inventive): the resin component of a two-part adhesive was prepared by combining 10.8 g of castor oil with 1.67 g of Baylith L paste (zeolite-based, castor oil-containing drier, manufacturer: Bayer AG) at 20° C. Subsequently 5.19 g of UK 5400 (hardener component of the solvent-free two-part adhesive Macroplast UK 8202, based on isocyanates; density 1.22±0.05 g/cm$^3$; viscosity [Brookfield RVT, 20° C.] 250±100 mPa.s; manufacturer: Henkel KgaA) were admixed as hardener.

Inventive adhesive: the resin component of a two-part adhesive was prepared by combining 10.8 g of castor oil with 1.67 g of Baylith L paste and 0.624 g of 4-aminosalicylic acid at 20° C. Subsequently 6.28 g of UK 5400 were admixed as hardener. The additional amount of hardener used in relation to the reference adhesive was calculated so that two NCO groups of the hardener corresponded to one amino group of the 4-aminosalicylic acid used, i.e., so that on the basis of the isocyanate-reactive amino hydrogen atoms of the 4-aminosalicylic acid used one equivalent of 4-aminosalicylic acid was compensated by two equivalents of the isocyanate.

The adhesives were used to bond sand blasted and degreased steel panels (reference experiment 2.1 and inventive experiment 2.2) and, respectively, aluminum panels (reference experiment 2.3 and inventive experiment 2.4) pretreated with a chrome-free pretreatment consisting of the steps of the alkaline cleaning (Ridoline 1580; manufacturer Henkel KgaA), pickling (Deoxidizer 4902; Henkel KgaA), and passivating (Alodine 2040; manufacturer: Henkel KgaA) over an area of 10×20 mm. The test specimens obtained in this way were subsequently stored at 20° C. for 14 days. Thereafter the tensile shear strength of the adhesive bond was determined. Further test specimens produced identically were subjected to a hot humid test at 70° C. and immediately after their removal were investigated, in the moist state, for their tensile shear strength.

The hot humid test was carried out by taking the test specimens stored at 20° C. for 14 days and wrapping them in cotton wool soaked with distilled water. This arrangement was subsequently wrapped in aluminum foil and stored in a plastic vessel with an airtight seal at 70° C. for one week or for two weeks or for four weeks. After the corresponding storage time the samples were removed, cooled to −30° C. for 16 hours in each case, then brought to 20° C. and immediately investigated for their tensile shear strength.

The tensile shear strengths determined after 2 weeks at 20° C. and after 1, 2, and 4 weeks in the hot humid test are reproduced in Table 3 below.

TABLE 3

| | Tensile shear strengths of the test specimens (all in MPa) | | | |
|---|---|---|---|---|
| Experiment | TSS 0 | TSS 1 | TSS 2 | TSS 4 |
| 2.1 | 4.3 | 3.2 | 1.9 | 2.1 |
| 2.2 | 10.2 | 10.9 | 9.7 | 8.3 |
| 2.3 | 3.62 | 3.08 | 3.90 | 3.71 |
| 2.4 | 5.34 | 8.11 | 6.98 | 5.42 |

TSS 0 = tensile shear strength after 2 weeks of storage at 20° C.
TSS 1 = tensile shear strength after 1 week of hot humid test
TSS 2 = tensile shear strength after 2 weeks of hot humid test
TSS 4 = tensile shear strength after 4 weeks of hot humid test Example 3

Reference adhesive (not inventive): 20 g of UK 8202 (resin component of the solvent-free two-part adhesive Macroplast UK 8202, based on hydroxyl-containing organic compounds; density 1.45±0.05 g/cm$^3$; viscosity [Brookfield RVT, 20° C.] 27 000±4 000 mPa.s; manufacturer: Henkel KgaA) and 5.0 g of UK 5400 were combined at 20° C.

Inventive adhesive: 20 g of UK 8202, 1.0 g of 4-aminosalicylic acid and 6.74 g of UK 5400 were combined at 20° C. The additional amount of hardener used as compared with the reference adhesive was again calculated so that on the basis of the isocyanate-reactive amino hydrogen atoms of the 4-aminosalicylic acid used one equivalent of 4-aminosalicylic acid was compensated by two equivalents of the isocyanate.

The adhesives were used to bond aluminum panels pretreated as in Example 2 (reference experiment 3.1 and inventive experiment 3.2) and aluminum panels merely cleaned with acetone but otherwise untreated (reference experiment 3.3 and inventive experiment 3.4) over an area of 10×20 mm. The test specimens obtained in this way were subjected to a procedure identical to that of Example 2.

The tensile shear strengths determined as in Example 2 after 2 weeks at 20° C. and after 1, 2, and 4 weeks in the hot humid test are reproduced in Table 4 below.

TABLE 4

| | Tensile shear strengths of the test specimens (all in MPa) | | | |
|---|---|---|---|---|
| Experiment | TSS 0 | TSS 1 | TSS 2 | TSS 4 |
| 3.1 | 13.0 | 1.34 | 0.54 | 0.81 |
| 3.2 | 14.4 | 15.1 | 14.0 | 13.4 |
| 3.3 | 10.2 | 2.21 | 3.48 | 1.20 |
| 3.4 | 14.6 | 10.5 | 5.58 | 8.25 |

TSS 0 = tensile shear strength after 2 weeks of storage at 20° C.
TSS 1 = tensile shear strength after 1 week of hot humid test
TSS 2 = tensile shear strength after 2 weeks of hot humid test
TSS 4 = tensile shear strength after 4 weeks of hot humid test

What is claimed is:

1. A binder component comprising (a) at least one substance selected from the group consisting of epoxy compounds, amino compounds having at least two amino groups, hydroxy compounds having at least two OH groups, mercapto compounds having at least two SH groups, isocyanates having at least two NCO groups and (b) at least one compound having chelating properties
wherein the at least one compound having chelating properties comprises from about 1 to about 25% by weight of said binder component and
comprises a compound of the general formula I, II or III

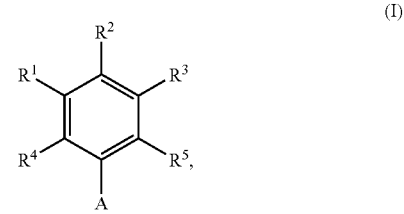

(I)

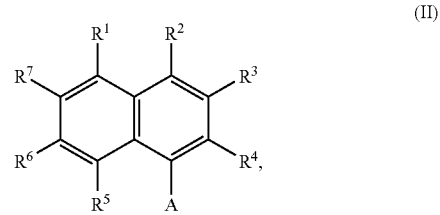

(II)

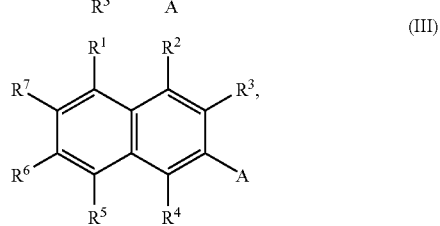

(III)

in which A is Y or X-Y, and Y is $NH_2$, $NHR^8$ or SH, and X is a linear or branched alkyl radical having 1 to 22 carbon atoms, and $R^1$, $R^2$, $R^3$, $R^4$, $R^5$, and in formulae II and III, $R^6$ and $R^7$, independently of one another, are H, $SO_3H$, $OSO_3H$, $OP(O)(OH)_2$, $P(O)(OH)_2$, $P(O)HOH$, COOH, OH, $NH_2$, $NHR^8$, $C(O)R^8$, CN or $NO_2$, in which $R^8$ is hydrogen or a linear or branched, saturated or unsaturated aliphatic hydrocarbon radical having 1 to 10 carbon atoms, or two adjacent radicals from $R^1$ to $R^7$ together form an aromatic or heteroaromatic ring, at least two of the radicals $R^1$ to $R^7$ not being H or part of an aromatic or heteroaromatic ring system, and the remaining radicals being arranged such that the compound of the general formula I, II or III binds to a divalent or polyvalent metal ligand in chelate form.

2. The binder component of claim 1 wherein the at least one compound having chelating properties contains an amino group or a mercapto group.

3. The binder component of claim 1 wherein the at least one compound having chelating properties comprises a compound of the general formula I.

4. The binder component of claim 1 wherein at least one of the radicals $R^1$ to $R^7$ is COOGH.

5. The binder component of claim 1 wherein the at least one compound having chelating properties comprises at least one member selected from the group consisting of aminosalicylic acids, aminoisophthalic acids, and derivatives thereof.

6. A process for preparing a binder component in accordance with claim 1, said process comprising mixing said at least one substance with said at least one compound having chelating properties.

7. The binder component of claim 1 wherein (a) comprises at least one epoxy compound and at least one second substance selected from the group consisting of amino compounds having at least two amino groups, hydroxy compounds having at least two OH groups, mercapto compounds having at least two SH groups, and isocyanates having at least two NCO groups.

8. The binder component of claim 1 wherein said at least one compound having chelating properties comprises from about 2 to about 20% by weight of said binder component.

9. The binder component of claim 1 comprising 20 to 90% by weight of at least one epoxy compound, and 3 to 79.9% by weight of at least one hardener selected from the group consisting of polymercaptan hardeners and polyamine hardeners.

10. The binder component of claim 1 comprising 35 to 90% by weight of at least one epoxy compound, 2 to 10% by weight of at least one catalytic hardener, 3 to 40% by weight of at least one filler, and 1 to 12% by weight of said at least one compound having chelating properties.

11. The binder component of claim 1 comprising 40 to 80 % by weight of at least one epoxy compound, 10 to 60% by weight of at least one hardener selected from the group consisting of polymercaptan hardeners and polyamine hardeners, and 2 to 15% by weight of said at least one compound having chelating properties.

12. The binder component of claim 1 comprising 50 to 80 % by weight of at least one diglycidyl ether, 10 to 49% by weight of at least one hardener selected from the group consisting of polyetheramines bearing at least two amino groups per molecule and polyaminoamides, and 2 to 12% by weight of said at least one compound having chelating properties.

13. The binder component of claim 1 comprising 25 to 60 % by weight of at least one epoxy compound, 15 to 40% by weight of at least one hardener selected from the group consisting of polyamines and polymercaptans, 10 to 40% by weight of at least one filler, and 1 to 12% by weight of said at least one compound having chelating properties.

14. The binder component of claim 1 additionally comprising at least one auxiliary selected from the group consisting of stabilizers, defoamers, antioxidants, photostabilizers, pigment dispersants, fillers, plasticizers, tackifiers, dyes, microbiocides, impact modifiers, and catalysts.

15. The binder component of claim 1 wherein said at least one compound having chelating properties contains a combination of functional groups selected from the group consisting of a) COOH and CHO, b) COOH and OH, c) COOH and $SO_3H$, d) COOH and COOH, e) $SO_3H$ and OH, f) $SO_3H$ and CHO, g) $OP(O)(OH)_2$ and COOH, h) $OP(O)(OH)_2$ and OH, i) $OP(O)(OH)_2$ and $OP(O)(OH)_2$, j) $OP(O)(OH)_2$ and CHO, k) $P(O)(OH)_2$ and $P(O)(OH)_2$, l) $P(O)(OH)_2$ and COOH, m) $P(O)(OH)_2$ and $SO_3H$, n) $P(O)HOH$ and COOH, o) $P(O)HOH$ and $P(O)HOH$, p) $P(O)HOH$ and OH, q) $P(O)HOH$ and CHO, and r) $P(O)HOH$ and $SO_3H$.

16. The binder component of claim 1 wherein said at least one compound having chelating properties is selected from the group consisting of 4- amino-2-hydroxybenzoic acid, 5-amino-2-hydroxybenzoic acid, 5-aminoisophthalic acid, 1-amino-2-hydroxynaphthalene-4-sulfonic acid, aminosalicylaldehyde, 4- aminophthalic acid, 4-aminophthalonitrile, mercaptosalicylic acid, mercaptoisophthalic acid, or a mixture thereof.

17. A method of coating or sealing a surface comprising applying a binder component in accordance with claim 1 to said surface and curing said binder component.

18. The method of claim 17 wherein said surface is comprised of metal.

19. A method of adhering a first substrate to a second substrate comprising using a binder component in accordance with claim 1 to bond said first substrate and said second substrate.

20. The method of claim 19 wherein at least one of said first substrate or said second substrate is comprised of metal.

* * * * *